United States Patent [19]

Merck et al.

[11] Patent Number: 4,740,580
[45] Date of Patent: Apr. 26, 1988

[54] ONE-STEP PROCESS FOR THE PREPARATION OF CARBOXYL GROUP-TERMINATED POLYESTERS

[75] Inventors: Yves Merck; Daniel Maetens; Jean-Marie Loutz, all of Brussels, Belgium

[73] Assignee: U C B, S.A., Brussels, Belgium

[21] Appl. No.: 38,318

[22] Filed: Apr. 14, 1987

[30] Foreign Application Priority Data

Apr. 14, 1986 [GB] United Kingdom ............... 8609034

[51] Int. Cl.$^4$ ................ C08G 63/02; C08G 63/76; C08F 283/00
[52] U.S. Cl. ................................ 528/272; 525/438; 528/296
[58] Field of Search ............... 525/437, 438; 528/272, 528/296, 297, 480

[56] References Cited

U.S. PATENT DOCUMENTS

| | | | |
|---|---|---|---|
| 4,442,269 | 4/1984 | Sommerfeld et al. | 525/440 |
| 4,528,341 | 7/1985 | Belder et al. | 525/438 |
| 4,605,710 | 8/1986 | Guilbert | 525/438 |
| 4,621,122 | 11/1986 | Guilbert et al. | 525/442 |

FOREIGN PATENT DOCUMENTS 1073753 6/1967 United Kingdom .

Primary Examiner—Lucille M. Phynes
Attorney, Agent, or Firm—Wenderoth, Lind & Ponack

[57] ABSTRACT

The present invention provides a process for the preparation of carboxyl group-terminated polyesters, which comprises reacting in one step at elevated temperatures, terephthalic acid and at least one dihydric aliphatic compound and optionally an aromatic polycarboxylic acid having three or more carboxyl groups and/or a polyhydric organic compound having three or more hydroxyl groups and/or a linear aliphatic or cycloaliphatic dicarboxylic acid, the proportions by weight of the respective reactants being such as to produce a polyester having an acid number of from 10 to 25 mg KOH/g and a hydroxyl number of at most 5 mg KOH/g.

The present invention also provides a process for preparing a powdered thermosetting coating composition suitable for application as paint or varnish on electricity-conducting articles by electrostatic powder spray methods and fluidized bed coating processes, wherein the carboxyl group-terminated polyester prepared as described above is homogeneously mixed with and epoxy compound containing at least two epoxy groups. The present invention further provides the compositions thus prepared.

18 Claims, No Drawings

ONE-STEP PROCESS FOR THE PREPARATION OF CARBOXYL GROUP-TERMINATED POLYESTERS

The present invention relates to the one-step process for the preparation of carboxyl group-terminated polyesters suitable for use in powdered thermosetting coating compositions, as well as to the carboxyl group-terminated polyesters obtained by this process. It also relates to the preparation of powdered thermosetting coating compositions based on the carboxyl group-terminated polyesters so prepared and epoxy compounds, as well as to compositions obtained by this process.

For several years, in the field of paints and varnishes, the use of powdered thermosetting compositions to replace liquid thermosetting compositions has met with ever-increasing success, justified by the following reasons:

(a) they do not contain any solvents; consequently, problems of toxicity, pollution and fire are avoided;

(b) they are more economical because, as mentioned above, solvents are not used and because excess thermosetting powder which is not fixed onto the substrate to be coated at the time of application may, in principle, be recovered completely;

(c) they permit the formation of thick coatings of up to 100 micrometers, which cannot be achieved in one coating layer with similar compositions containing solvents.

The powdered thermosetting compositions are widely used for coating domestic electric appliances, bicycles, garden furniture, accessories for the automobile industry, and the like.

The technique of using powdered thermosetting coating compositions is very simple: the powders are applied by means of a spray gun onto the article to be coated, which is a conductor of electricity, with a average potential difference of at least 50,000 volts. For this reason, the particles charged with electrostatic electricity form a regular coating on the article, while the excess powder, which does not adhere to the article because of the insulating effect of the particles already retained, may be recovered. The coated article is then heated in an oven where cross-linking of the thermosetting binder of the coating is carried out. In this manner, it acquires its final mechanical and chemical properties.

These powdered thermosetting coating compositions can also be used for the fluidized bed coating technique. The article to be coated is heated and introduced into a fluidized bed of particles of the powdered thermosetting composition, so that the fluidized particles which come into contact with the heated article undergo an initial fusion and are retained in the article by adhesion. The article thus coated is then heated in an oven to carry out crosslinking of the coating in exactly the same way as in the technique described above using an electrostatic spray gun.

The powdered thermosetting coating compositions known in the art frequently comprise carboxyl group-terminated polyesters having acid numbers of from about 30 to 100. Such compositions are disclosed, for example in U.S. Pat. Nos. 4,085,159 and 4,147,737. Unfortunately, these compositions have several limitations such as they require a high content of epoxy compound which reduces the glass transition temperature of the mixture, thus limiting its storage stability; the cured coatings have limited heat resistance; and the cured coatings have limited weathering resistance.

The carboxyl group-terminated polyesters used in this field require a high content of terephthalic acid as the aromatic dicarboxylic acid to get a high glass transition temperature in order to obtain both a good storage stability of the powdered compositions and high mechanical properties for the resulting coatings. However, as it is well known by those skilled in the art, terephthalic acid is only very slightly soluble in most solvents, and particularly in the desired carboxyl group-terminated polyesters, and it is not liquid at the temperature required for producing these polyesters. For these reasons, it has been considered that it is not possible to prepare in one step a carboxyl group-terminated polyester based mainly on terephthalic acid, i.e. if terephthalic acid represents approximately 100 mol % of the aromatic dicarboxylic acids used. Accordingly, hitherto the carboxyl group-terminated polyesters are commonly obtained in a two-step process in which, in a first step, a hydroxyl group-terminated polyester containing the terephthalic acid is prepared and in which, in a second step, the hydroxyl group-terminated polyester is further reacted with another polybasic carboxylic acid or anhydride.

Such a typical process is described for example in U.S. Pat. No. 4,085,159 wherein an aromatic or hydroaromatic dicarboxylic acid is used in the second step. The use of dicarboxylic acid anhydrides, such as succinic anhydride for this purpose is illustrated in U.S. Pat. No. 3,966,836. Furthermore, U.S. Pat. No. 4,147,737 relates to the use of an at least tribasic, aromatic carboxylic acid anhydride, such as the anhydride of trimellitic acid or pyromellitic acid, for the same purpose.

In the past, carboxyl group-terminated polyesters with an acid number of less than 30 mg KOH/g have already been proposed, because these polyesters exhibit some interesting properties. For example, because of the higher molecular weight, the relative proportion of low molecular weight polyester chains is reduced, thus improving the storage stability of the powders prepared therewith; they require less polyepoxy resin for crosslinking, thus improving the heat resistance; the reduced necessary quantity of polyepoxy resin also improves the weathering resistance; and they require less polyepoxy resin for crosslinking thus further improving the storage stability of the powders.

Polyesters with an acid number of 10 to 26 mg KOH/g are described, for example, in U.S. Pat. Nos. 4,471,108 and 4,528,341. According to these patents, the polyesters are prepared by methods already known per se, e.g. by esterification of interesterification. More particularly, according to the examples, the preparation of the polyester resin is carried out according to the conventional two-step process, where in a second step the hydroxyl group-terminated polyester obtained in a first step, is subsequently reacted with a dibasic carboxylic acid such as isophthalic acid.

According to the present invention, we have, surprisingly, found that it is possible to obtain in one step a linear or branched-chain carboxylic group-terminated polyester with an acid number of from 10 to 25 mg KOH/g, even though approximately 100 mol % of terephthalic acid in the form of free acid is used as the dicarboxylic aromatic acid. Furthermore, the high concentration of terephthalic acid used as the aromatic dicarboxylic acid provides more reactive polyester resins which, when mixed with an epoxy compound containing at least two epoxy groups, produce powdered thermosetting coating compositions which give coatings which have better mechanical properties than the corresponding prior art coatings.

More specifically, the present invention provides a process for preparing polyesters useful for the preparation of powdered thermosetting coating compositions suitable for application as paint or varnish on electricity-conducting articles by powder spray methods and fluidized bed coating processes, which process comprises reacting, in one step at elevated temperatures, terephthalic acid and at least one dihydric aliphatic compound and optionally an aromatic polycarboxylic acid having three or more carboxyl groups and/or a polyhydric organic compound having three or more hydroxyl groups and/or a linear aliphatic or cycloaliphatic dicarboxylic acid, the proportions by weight of the respective reactants being such as to produce a polyester with an acid number of from 10 to 25 mg KOH/g and a maximum hydroxyl number of 5 mg KOH/g.

According to the present invention, there is further provided a process for the preparation of powdered thermosetting coating compositions wherein the carboxyl group-terminated polyester prepared as described hereinbefore, is homogeneously mixed with an epoxy compound containing at least two epoxy groups and optionally with auxiliary substances conventionally used in the manufacture of powdered paints and varnishes.

The present invention further comprises the compositions thus prepared.

Illustrative of suitable dihydric aliphatic compounds are, for example, ethylene glycol, diethylene glycol, thriethylene glycol, propylene glycol, 1,3-propanediol, 1,4-butanediol, 1,6-hexanediol, neopentyl glycol, 1,4-cyclohexanedimethanol, neopentyl glycol hydroxypivalate and the like. Preferably at least 50 mol % of the dihydric aliphatic compound is neopentyl glycol.

Suitable aromatic polycarboxylic acids having three or more carboxyl groups, include, for example, trimellitic acid, pyromellitic acid and the like, and their functional derivatives such as anhydrides, acid chlorides and lower alkyl esters.

Among suitable polyhydric organic compounds having three or more hydroxyl groups, there may be mentioned, for example, glycerol, hexanetriol, trimethylolethane, trimethylolpropane, pentaerythritol and the like.

We have found it useful to include a maximum of about 20 mol %, and preferably up to 10 mol %, based on the terephthalic acid in the polyester, of a linear aliphatic dicarboxylic acid, such as adipic acid, succinic acid, sebacic acid, azelaic acid or the like, or of a cycloaliphatic dicarboxylic acid such as dihydrophthalic acid, tetrahydrophthalic acid, hexahydrophthalic acid, 1,4-cyclohexanedicarboxylic acid or the like. The presence thereof assists in adjusting the viscosity of the final carboxyl group-terminated polyester resin.

The total amount of dihydric and polyhydric organic compound having three or more hydroxyl groups relative to the total amount of dicarboxylic and aromatic polycarboxylic acids having three or more carboxyl groups, used in the preparation of the carboxyl group-terminated polyester is such that the calculated acid number of the final resulting polyester is in the range of from 10 to 25 mg KOH/g and that the total average functionality of the polyesters is in the range of from 2 to 3 and preferably of from 2 to 2.5; the corresponding theoretical of number-average molecular weight is of from 3,700 to 11,200. Preferably, the carboxyl group-terminated polyester will have an experimental acid number of from 10 to 25 mg KOH/g. The experimental hydroxyl number of the resulting polyester is at maximum of 5 mg KOH/g.

The glass transition temperature of the carboxyl group-terminated polyester is of from 50° to 80° C. and preferably of from 55° to 70° C.

The carboxyl group-terminated polyesters of the present invention are prepared in a single step by conventional methods utilized for the synthesis of polyesters. Generally, use is made of a conventional reactor equipped with a condenser and water of esterification is removed by azeotropic distillation or under vacuum. Polyesterification is usually carried out at a temperature which is gradually increased from 160° C. to about 210° to 260° C., initially at atmospheric pressure or under pressure and then under reduced pressure, these operating conditions being maintained until a polyester is obtained which has the desired acid number and a hydroxyl number of at most 5 mg KOH/g. This polyesterification may be carried out in the presence of usual catalysts such as dibutyltin oxide.

The carboxyl group-terminated polyester is then cast into a thick layer and allowed to cool, whereafter it is ground to give particles with an average size of from a fraction of a millimeter to a few millimeters.

The epoxy compounds containing at least two epoxy groups suitable for the purposes of the present invention are for example solid epoxy resins based on bisphenol A and epichlorohydrin, i.e. the diglycidyl ether of bisphenol A and higher addition products thereof. Epoxy resins such as Epikote resins from SHELL, Araldite resins from CIBA-GEIGY and DER resins from DOW CHEMICAL are illustrative examples of crosslinking compounds for the carboxyl group-terminated polyesters of the invention. Another suitable example is triglycidyl isocyanurate marketed by CIBA-GEIGY under the trademark Araldite PT 810.

The polyepoxy compound may be used in an amount of from 0.7 to 1.3 and preferably of from 0.95 to 1.05 equivalents of epoxy groups per equivalent of carboxyl groups in the carboxyl group-terminated polyester.

The carboxyl group-terminated polyester and the polyepoxy compound are homogeneously mixed, usually in the melt, preferably in a kneader such as a Buss or a twin-screw Werner-Pfleiderer extruder. Thereafter, the extrudate is ground and sieved. The resulting powder with a particle size generally of from 30 to 80 micrometers is then applied to a metal substrate using a spray gun in an electrostatic field at a voltage of from 50 to 70 kV and then cured in an oven at a temperature of from 140° to 220° C. and preferably of from 160° to 200° C. for 10 to 30 minutes.

Auxiliary substances which may be added to the powdered thermosetting compositions include, for example, pigments such as titanium dioxide, iron oxides, organic dyestuffs or the like, as well as fillers, such as barium sulfate or calcium carbonate and/or sulfate, flow control agents, such as Modaflow (MONSANTO), Acronal 4 F (BASF) or Resiflow PV 5 (WORLEE), plasticizers, such as phthalates and phosphates, particularly dicyclohexyl phthalate and triphenyl phosphate, and grinding aids, catalysts and the like. These auxiliary substances are used in their usual effective proportions, it being understood that if the compositions are to be used as varnishes, then the addition of auxiliary substances which possess opacifying properties must be omitted.

The following examples further illustrate the preferred embodiments of this invention. In these examples, all parts are by weight unless otherwise specified.

EXAMPLE 1

2257.0 g of neopentyl glycol and 118.8 g of ethylene glycol are placed in a 10 liter glass reactor provided with a stirrer and a fractionating column. The glycols are heated to 130° C. and 4084.2 g of terephthalic acid and 6.5 g of dibutyltin oxide are added. The temperature is gradually raised to 225° C. and this temperature is maintained, finally under vacuum, until 850 g of water separate off and a clear resin is obtained having an acid number of 22 mg KOH/g, a hydroxyl number of 3.8 mg KOH/g and a flow rate at 125° C. (ASTM D 1238, procedure A) of 2.5 g/10 min.

EXAMPLE 2

The following compounds are introduced into a reactor of the type described above:
terephthalic acid: 3872.6 g,
adipic acid: 203.8 g,
neopentyl glycol: 2268.6 g,
ethylene glycol: 119.4 g,
dibutyltin oxide: 6.5 g.

After condensation and removal of 854.3 g of water, the carboxyl group-terminated polyester has an acid number of 19 mg KOH/g, a hydroxyl number of 1.3 mg KOH/g and a flow rate at 125° C. of 9.5 g/10 min.

EXAMPLES 3 and 4

These Examples illustrate the use of trihydric organic compounds and tricarboxylic organic acids in the preparation of branched-chain carboxyl group-terminated polyesters according to the process of the present invention.

The procedure of Example 1 is followed, but the components of the polyesters and their proportions by weight are as indicated in the following Table:

TABLE

| Composition (g) | Ex. 3 | Ex. 4 |
| --- | --- | --- |
| terephthalic acid | 4582.6 | 4478.1 |
| adipic acid | 509.2 | 497.6 |
| neopentyl glycol | 2781.85 | 2857.6 |
| ethylene glycol | 146.4 | 150.4 |
| trimethylolpropane | 67.1 | — |
| trimellitic anhydride | — | 96.1 |
| dibutyltin oxide | 8.1 | 8.1 |
| water removed (g) | 1074.7 | 1067.1 |
| acid number (mg KOH/g) | 24 | 23 |
| hydroxyl number (mg KOH/g) | 2.6 | 2.2 |
| flow rate (g/10 min) | 8 | 7 |
| functionality (calculated) | 2.5 | 2.5 |

EXAMPLE 5

By way of comparison as reflective of prior art approaches, a polyester is prepared in two steps; this polyester has the same composition as the polyester prepared in Example 3, except that part of the terephthalic acid is replaced by isophthalic acid.

1043.4 g of neopentyl glycol, 54.9 g of ethylene glycol and 18.8 g of trimethylolpropane are heated to 130° C. in the reactor described in Example 1. 1481.3 g of terephthalic acid, 164.6 g of adipic acid and 2.8 of dibutyltin oxide are then added. Condensation is carried out as in Examples 1 to 4. The resulting branched-chain hydroxyl group-terminated polyester has a hydroxyl number of 53 mg KOH/g, an acid number of 5 mg KOH/g and a calculated total functionality of 2.14.

Subsequently, 235.5 g of isophthalic acid are introduced at 180° C. and then heated up to 225° C. After esterification at atmospheric pressure, heating is continued under vacuum until an acid number of approximately 20 mg KOH/g is obtained, 38.6 g of water being removed.

The final carboxyl group-terminated polyester has an acid number of 22 mg KOH/g, a hydroxyl number of 4 mg KOH/g, a flow rate at 125° C. of 6 g/10 min. and a calculated total functionality of 2.5.

EXAMPLE 6

Preparation of outdoor powder coatings

The polyesters obtained according to the processes of Examples 1 to 4 are formulated into thermosetting powders as follows:

63.6 parts by weight of each of the polyesters described in Examples 1 to 4 are mixed with 2.7 parts by weight of powdered triglycidyl isocyanurate (TGIC, CIBA-GEIGY), 16.5 parts by weight of barium sulfate (Blanc Fixe N), 13.2 parts by weight of ferrous oxide (Bayferrox 318, BAYER), 3.3 parts by weight of titanium dioxide (Kronos 2160) and 0.7 parts by weight of acrylic modifier (Resiflow PV 5, WORLEE). The dry blend is homogenized in a Buss Ko-Kneader PR 46 extruder at 100° C. After cooling, the extrudate is ground, milled and sieved. The powder thus obtained with a particle size of from 30 to 75 micrometers is applied to 0.5 mm cold-rolled steel plate degreased with 1,1,1-trichlorethane, using a spray gun, in an electrostatic field at a voltage of 55 kV. The thickness of the coating is approximately 60 micrometers. The applied layers are then cured for 15 minutes at 200° C. and then subjected to mechanical tests.

| | Formulation based on the polyester of | | | |
| --- | --- | --- | --- | --- |
| Tests | Ex. 1 | Ex. 2 | Ex. 3 | Ex. 4 |
| direct impact (ASTM D2794) (kg.cm) | 40 | 80 | 80 | 80 |
| reverse impact (ASTM D2794) (kg.cm) | 40 | 40 | 80 | 80 |
| Erichsen embossing (ISO 1520) (mm) | 9.0 | 10.4 | 10.6 | 10.7 |
| Adhesion (ASTM D3002) (%) | 100 | 100 | 100 | 100 |
| conical mandrel (ASTM D522) | Pass | Pass | Pass | Pass |
| gloss at 60° (ASTM D523) (%) | 86 | 90 | 82 | 80 |

The polyesters obtained according to the improved process of the present invention are thus seen to have high performance characteristics in such coatings.

EXAMPLE 7

Preparation of hybrid powder coatings

The polyesters obtained according to the processes of Examples 3 and 5 are formulated as follows:

46.4 parts by weight of each of the polyesters described in Examples 3 and 5 are mixed with 13.1 parts by weight of epoxy resin (Araldite GT 7004, CIBA-GEIGY), 39.6 parts by weight of titanium dioxide (Kronos CL 310), 0.7 parts by weight of acrylic polymer (Resiflow PV 5, WORLEE) and 0.35 parts by weight of tetrabutylammonium bromide. The powder is prepared in the same manner as for outdoor powder coatings and applied as above. The deposited layers of thermosetting powders are cured for 15 minutes at 180° C. and then evaluated for their mechanical properties.

| Tests | Formulation based on the polyester of | |
|---|---|---|
|  | Ex. 3 | Ex. 5 |
| direct impact (ASTM D2794) (kg.cm). | 80 | 40 |
| reverse impact (ASTM D2794) (kg.cm) | 80 | 20 |
| Erichsen embossing (ISO 1520) (mm) | 10 | 10 |
| adhesion (ASTM D3002) (%) | 100 | 100 |
| conical mandrel (ASTM D522) | Pass | Pass |
| gloss at 60° (ASTM D523) (%) | 82 | 91 |

The advantage of the polyesters obtained according to the process of the present invention is demonstrated by a comparison of the properties of the coatings obtained therewith with those of comparative Example 5.

Variations may be made in procedures, proportions and materials without departing from the scope of the present invention as defined by the claims.

We claim:

1. A process for the preparation of carboxyl group-terminated polyesters which comprises reacting in one step at elevated temperatures, terephthalic acid and at least one dihydric aliphatic compound, the proportions by weight of the respective reactants being such a to produce a polyester with an acid number of from 10 to 25 mg/KOH/g and a maximum hydroxyl number of 5 mg KOH/g.

2. The process of claim 1, wherein said dihydric aliphatic compound is ethylene glycol, diethylene glycol, triethylene glycol, propylene glycol, 1,3-propanediol, 1,4-butanediol, 1,6-hexanediol, neopentyl glycol, 1,4-cyclohexanedimethanol or neopentylglycol hydroxypivalate.

3. The process of claim 1, wherein the dihydric aliphatic compound comprises at least 50 mole % of neopentyl glycol.

4. The process of claim 1, wherein said reactants also include an aromatic polycarboxylic acid having three or more carboxyl groups and/or a polyhydric organic compound having three or more hydroxyl groups and/or a linear aliphatic or cycloaliphatic dicarboxylic acid.

5. The process of claim 4, wherein said aromatic polycarboxylic acid having three or more carboxyl groups is trimellitic acid, trimesic acid, pyromellitic acid or an anhydride, acid chloride or lower alkyl ester thereof.

6. The process of claim 4, wherein said polyhydric organic compound having three or more hydroxyl groups, is glycerol, hexanetriol, trimethylolethane, trimethylolpropane or pentaerythritol.

7. The process of claim 4, wherein said linear aliphatic or cycloaliphatic dicarboxylic acid is present in an maximum of about 20 mol percent based on the terephthalic acid.

8. The process of claim 7, wherein said linear aliphatic or cycloaliphatic dicarboxylic acid is present in a maximum of 10 mol percent based on the terephthalic acid.

9. The process of claim 1, wherein the polyester produced has a theoretical number-average molecular weight of from 3,700 to 11,200 and a glass transition temperature of from 50° to 80° C.

10. A carboxyl group-terminated polyester prepared by reacting, in one step at an elevated temperature, terephthalic acid with at least one dihydric aliphatic compound, the proportions by weight of the respective reactants being such that the polyester has an acid number of from 10 to 25 mg KOH/g and a maximum hydroxyl number of 5 mg KOH/g.

11. A process for preparing a powdered thermosetting coating composition suitable for application as paint or varnish on electricity-conducting articles by electrostatic powder spray or fluidized bed coating processes which comprises reacting in one step at elevated temperatures, terephthalic acid and at least one dihydric aliphatic compound, the proportions by weight of the respective reactants being such as to produce a polyester with an acid number of from 10 to 25 mg KOH/g and a maximum hydroxyl number of 5 mg KOH/g; homogeneously mixing the resulting carboxyl group-terminated polyester with an epoxy compound containing at least two epoxy groups, the ratio of said epoxy compound to said carboxyl group-terminated polyester being such that there are from 0.7 to 1.3 equivalents of epoxy groups per equivalent of carboxyl groups in said carboxyl group-terminated polyester; and converting the resulting homogeneous mixture into a powder.

12. The process of claim 11, wherein the dihydric aliphatic compound comprises at least 50 mole % of neopentyl glycol.

13. The process of claim 11, wherein said reactants also include an aromatic polycarboxylic acid having three or more carboxyl groups and/or a polyhydric organic compound having three or more hydroxyl groups and/or a maximum of about 20 mol percent based on terephthalic acid of a linear aliphatic or cycloaliphatic dicarboxylic acid.

14. The process of claim 11, wherein said polyester has a theoretical number-average molecular weight of from 3,700 to 11,200 and a glass transition temperature of from 50° to 80° C.

15. The process of claim 11, wherein said epoxy compound is triglycidyl isocyanurate or the diglycidyl ether of bisphenol A.

16. The process of claim 11, wherein the powder has a particle size of from 30 to 80 micrometers.

17. A powdered thermosetting coating composition which comprises a homogeneous mixture of (a) an epoxy compound containing at least two epoxy groups and (b) a carboxyl group-terminated polyester prepared by reacting, in one step at an elevated temperature, terephthalic acid and at least one dihydric aliphatic compound, the proportions by weight of the respective reactants being such that the polyester has an acid number of from 10 to 25 mg KOH/g and a maximum hydroxyl number of 5 mg KOH/g, the ratio of said epoxy compound to said carboxyl group-terminated polyester being such that there are from 0.7 to 1.3 equivalents of epoxy groups per equivalent of carboxyl groups in said carboxyl group-terminated polyester.

18. An electricity-conducting article coated with a composition of claim 17.

* * * * *